US011127380B2

(12) United States Patent
Beith et al.

(10) Patent No.: US 11,127,380 B2
(45) Date of Patent: Sep. 21, 2021

(54) CONTENT STABILIZATION FOR HEAD-MOUNTED DISPLAYS

(71) Applicant: QUALCOMM Incorporated, San Diego, CA (US)

(72) Inventors: Scott Beith, Carlsbad, CA (US); Ananthapadmanabhan Arasanipalai Kandhadai, San Diego, CA (US); Jonathan Kies, Encinitas, CA (US); Robert Tartz, San Marcos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/713,462

(22) Filed: Dec. 13, 2019

(65) Prior Publication Data
US 2021/0183343 A1 Jun. 17, 2021

(51) Int. Cl.
G09G 5/38 (2006.01)
G06T 7/73 (2017.01)
G01C 3/08 (2006.01)
G02B 27/01 (2006.01)
G09G 5/37 (2006.01)

(52) U.S. Cl.
CPC ............... G09G 5/38 (2013.01); G01C 3/08 (2013.01); G02B 27/0172 (2013.01); G02B 27/0179 (2013.01); G06T 7/74 (2017.01); G09G 5/37 (2013.01); G02B 2027/0138 (2013.01); G02B 2027/0187 (2013.01); G06T 2207/30201 (2013.01); G09G 2340/0464 (2013.01); G09G 2340/0492 (2013.01); G09G 2354/00 (2013.01)

(58) Field of Classification Search
None
See application file for complete search history.

(56) References Cited

U.S. PATENT DOCUMENTS

| 2012/0026466 A1* | 2/2012 | Zhou ................... A61B 3/102 351/214 |
| 2012/0068913 A1* | 3/2012 | Bar-Zeev ............ G02B 27/0172 345/8 |
| 2018/0096503 A1 | 4/2018 | Kaehler et al. |
| 2019/0377191 A1* | 12/2019 | Hughes .............. G06K 9/00617 |

OTHER PUBLICATIONS

International Search Report and Written Opinion—PCT/US2020/060028—ISA/EPO—dated Feb. 25, 2021.

* cited by examiner

Primary Examiner — Frank S Chen
(74) Attorney, Agent, or Firm — Qualcomm Incorporated

(57) ABSTRACT

A head-mounted device may include a processor configured to receive information from a sensor that is indicative of a position of the head-mounted device relative to a reference point on a face of a user; and adjust a rendering of an item of virtual content based on the position or a change in the position of the device relative to the face. The sensor may be distance sensor, and the processor may be configured to adjust the rendering of the item of virtual content based a measured distance or change of distance between the head-mounted device and the point of reference on the user's face. The point of reference on the user's face may be one or both of the user's eyes.

27 Claims, 9 Drawing Sheets

CONTENT STABILIZATION FOR HEAD-MOUNTED DISPLAYS

BACKGROUND

In recent years augmented reality software applications that combine real-world images from a user's physical environment with computer-generated imagery or virtual objects (VOs) have grown in popularity and use. An augmented reality software application may add graphics, sounds, and/or haptic feedback to the natural world that surrounds a user of the application. Images, video streams and information about people and/or objects may be presented to the user superimposed on the visual world as an augmented scene on a wearable electronic display or head-mounted device (e.g., smart glasses, augmented reality glasses, etc.).

SUMMARY

Various aspects include head-mounted devices for use in an augmented reality system that are configured to compensate for movement of the device on a user's face. In various aspects a head-mounted device may include a memory, a sensor, and a processor coupled to the memory and the sensor, in which the processor may be configured to receive information from the sensor, in which the information may be indicative of a position of the head-mounted device relative to a reference point on a face of a user, and adjust a rendering of an item of virtual content based on the position.

In some aspects, the information received from the sensor relates to a position of the head-mounted device relative to an eye of the user, in which the processor may be configured to adjust the rendering of the item of virtual content based on the position of the head-mounted device relative to the eye of the user. In some aspects, the sensor may include an infrared (IR) sensor and IR light source configured to emit IR light towards the user's face. In some aspects, the sensor may include an ultrasound sensor configured to emit a pulse of ultrasound towards the user's face and determine the position of the head-mounted device relative to the reference point on a user's face. In some aspects, the sensor may include a first camera, and in some aspects the sensor further may include a second camera. In some aspects, the head-mounted device may further include an image rendering device coupled to the processor and configured to render the item of virtual content.

In some aspects, the processor may be further configured to determine an angle to the user's eyes from an image rendering device on the head-mounted device and adjust the rendering of the item of virtual content based on the determined angle to the user's eyes and the determined distance between the head-mounted device and the point of reference on the user's face.

Some aspects may include a method of adjusting rendering of an item of virtual content in an augmented reality system to compensate for movement of a head-mounted device on a user, which may include determining a position of the head-mounted device relative to a point of reference on the user's face, and adjusting the rendering of the item of virtual content based on the determined position of the head-mounted device relative to the point of reference on the user's face. In some aspects, the point of reference on the user's face may include an eye of the user.

Some aspects may further include receiving information from a sensor that relates to a position of the head-mounted device relative to an eye of the user, in which adjusting the rendering of the item of virtual content based on the determined position of the head-mounted device relative the point of reference determined on the user's face may include adjusting the rendering of the item of virtual content based on a distance and angle to an eye of the user determined based on the position of the head-mounted device relative to the eye of the user.

In some aspects, determining the position of the head-mounted device relative to the point of reference on the user's face may include determining the position of the head-mounted device relative to the point of reference on the user's face based on information received from an infrared (IR) sensor and IR light source configured to emit IR light towards the user's face.

In some aspects, determining the position of the head-mounted device relative to a point of reference on the user's face may include determining the position of the head-mounted device relative to the point of reference on the user's face based on information received from an ultrasound sensor configured to emit a pulse of ultrasound towards the user's face.

In some aspects, determining the position of the head-mounted device relative to a point of reference on the user's face may include determining a change in the position of the head-mounted device relative to the point of reference on the user's face, and adjusting the rendering of the item of virtual content based on the determined position of the head-mounted device relative to the point of reference on the user's face may include adjusting the rendering of the item of virtual content based on the change in position of the head-mounted device relative to the point of reference on the user's face In some aspects, determining the position of the head-mounted device relative to a point of reference on the user's face may include performing a time-of-flight measurement by the processor based on signal emitted by a sensor on the head-mounted device. In some aspects, determining the position of the head-mounted device relative to a point of reference on the user's face may include performing a triangulation operation by the processor based on images captured by an imaging sensor on the head-mounted device.

Further aspects include a non-transitory processor-readable storage medium having stored thereon processor-executable instructions configured to cause a processor in a head-mounted device or an associated computing device to perform operations of any of the methods summarized above. Further aspects include a head-mounted device or an associated computing device having means for accomplishing functions of any of the methods summarized above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

DETAILED DESCRIPTION

Figure 1A:
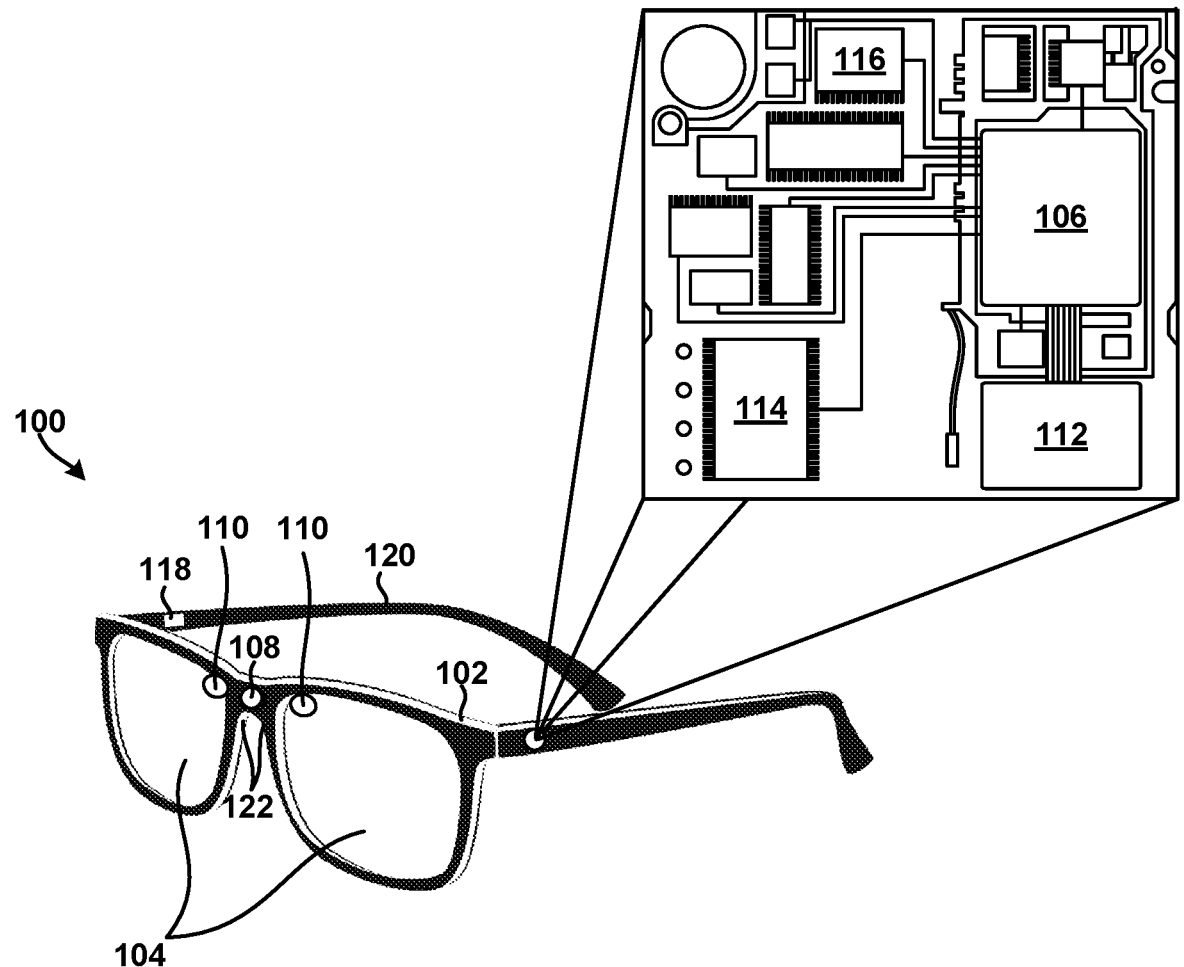
FIG. 1A is an illustration of a head-mounted device (e.g., augmented reality glasses) that may be configured to perform vision-based registration operations that account for changes in distances/angles between the cameras of the head-mounted device in accordance with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Augmented reality systems work by displaying an element of virtual content so that it appears on, near or associated with an object of volume in the real world. The term "augmented reality system" refers to any system that renders items of virtual content within a scene that includes real-world objects, including systems that render items of virtual content so they appear suspended within the real world, mixed reality systems, and video pass-through systems that render images of real-world objects (e.g., obtained by an outward-facing camera) combined with items of virtual content. In a common form of augmented reality systems, a user wears a head-mounted device that includes an outward facing camera that captures images of the real world, a processor (which may be a separate computing device or a processor within the head-mounted device) generates items of virtual content (e.g., images, text, icons, etc.), uses images from the outward facing camera to determine how or where the items of virtual content should be rendered to appear on, near or associated with selected real world object(s), and an image rendering device (e.g., a display or projector) that renders images so that to the user the items of virtual content appear to be in the determined location(s) with respect to real world objects.

For ease of describing various embodiments, the positioning of items of virtual content with respect to selected real world object(s) is referred to herein as "registration" and an item of virtual content is "registered" with a real-world object when the item appears to the user to be on, near or associated with selected real world object(s). As used herein, an item of virtual content is "associated with" a real-world object when the augmented reality system attempts to render the item such that the item appears registered (i.e., appearing to be on, near or remaining at a fixed relative position) with the real-world object.

In registering items of virtual content associated with distant real world objects, a head-mounted device renders the virtual content so that it appears to the user to be at the same distance as the real world objects, even though the virtual content is being rendered by an image rendering device (e.g., projector or display) that is only a few centimeters from the user's eyes. This may be accomplished through the use of lenses in the image rendering device that refocus light from the projection or display of virtual content so that the light is focused by the lens of the user's eye on the retina when the user is looking at the distant real-world objects. Thus, even though the image of virtual content is generated within millimeters of a user's eyes, the virtual content appears in focus as if it were at the same distance from the user as the real-world objects with which it is associated by the augmented reality system.

Conventional head-mounted devices used for augmented reality applications typically include a thick or cumbersome nose bridge and frame, or are designed to be secured to the head of the user via a head strap. As augmented reality software applications continue to grow in popularity and use, it is expected that there will be an increased consumer demand for new types of head-mounted devices that have thinner or lighter nose bridges and frames, and which may be worn without a head strap, similar to reading glasses or spectacles. Due to these and other new characteristics, it may be more likely that the nose bridge will slide down the nose of the user, that the frame will move or shift on the face of the user, and that the user will frequently adjust the location, position and orientation of the head-mounted device on the user's nose and face (similar to how people currently adjust their reading glasses or spectacles). Such movements and adjustments of the devices may change the positions, orientations, distances and angles between the camera of the head-mounted device, the eyes of the user, and the electronic display of head-mounted device.

Projecting or lensing items of virtual content from an image rendering device (e.g., a projector or display) close to the user's eyes so that the virtual content appears registered with a real world object and in focus when the user looks at distant real world objects in a head-mounted device involves the use waveguides, laser projections, lenses or projectors. Such rendering techniques that make the apparent position of rendered content sensitive to changes in the distance and angles between the user's eyes and the image rendering device (e.g., projector or display). If such distance and angles remain fixed, then the items of virtual content may remain in focus and appear to remain registered with the real-world objects in a fixed relative position determined by the augmented reality system. However, if the distance and angles between the user's eye and the an image rendering device (e.g., projector or display) changes (e.g., if the head-mounted device slips down the user's nose or the user repositions the head-mounted device on the user's face), that will change the apparent depth and/or location of items of virtual content, while the distance to and location of real world objects does not appear to change (i.e., items of virtual content appear to move with respect to real-world objects). Due to the short distance from the image rendering device (e.g., projector or display) to the user's eye compared to the distance to real world objects, even small changes in distance and angle of the head-mounted device will appear to move items of virtual content through large angles and distances compared to the distant objects.

Even when not directly interacting with the virtual objects, the user may make subtle movements (head, neck or facial movements, etc.) and abrupt movements (e.g., running, jumping, bending over, etc.) that may impact the apparent positions and orientations of items of virtual content with respect to real-world objects. Such user movements may also cause a head-mounted device to move or shift on the user's nose or face, which changes the distance and angle between the virtual object image rendering device (e.g., projector or display) and the user's eyes. This may cause apparent changes in positions, apparent distances and/or orientations of the items of virtual content with respect to real-world objects. Similarly, when the user manually adjusts the position of the head-mounted device on the user's face, any movement changes the orientation, distance and/or position of the display optics relative to the user's eyes, depending upon the amount and direction/rotation of movement. These movements of the head-mounted device relative to the user's eyes can result in the virtual objects appearing at a different distance than real world objects (e.g., appear out of focus when the user looks at the real-world objects), as well as at different angular locations compared to the real world objects. Such sensitivity of virtual object apparent distance and angular position to movement of the head-mounted device on the user's face may impact the fidelity of the augmented scene and degrading the user experience.

Some conventional solutions attempt to improve the accuracy of the registration by collecting information from external sensing devices, such as magnetic or ultrasonic sensors communicatively coupled to the head-mounted device, to determine position and orientation relative to the user's eyes, and use this information during the positioning phase of the vision-based registration to adjust the locations in which the virtual objects will be rendered. For example, a conventional head-mounted device may include gyroscopes and accelerometers that can sense rotations of the device through three axes of rotation and movement through three dimensions (i.e., 6 degrees of freedom). While these conventional solutions, particularly in combination with images provided by outward facing cameras, provide information to the augmented reality system that enable realigning (e.g., update the registration of) items of virtual reality with associated real world objects, such sensors do not account for movements of the head-mounted device relative to the eyes of the user. Rather, most conventional vision-based registration techniques/technologies presume a fixed position and orientation of the outward facing camera and the inward facing image rendering device (e.g., waveguide, projector or display) relative to the user's eyes. Consequently, conventional augmented reality head-mounted devices may exhibit frequent changes in the apparent distance and angular position of items of virtual content with respect to distant objects due to movements of the devices on the user's face.

In overview, various embodiments include a head-mounted device that is equipped with both outward facing world-view image sensors/cameras and inward facing gaze-view sensors/cameras. The inward facing gaze-view sensors/cameras may be configured to determine or measure changes in the distance and angle (referred to herein as "position" as defined below) between the image rendering device (e.g., projector or display) and the user's eyes. In a typical head-mounted device, the image rendering device (e.g., projector or display) will be a fixed distance from the outward facing camera (or more accurately, the image plane of the outward facing camera). Thus, while the augmented reality system determines the appropriate rendering of items of virtual content to appear associated with (i.e., appear to be on or located near) a real world object or objects, this process presumes a fixed distance and angular relationship between the outward facing camera image plane and the image rendering device (e.g., projector or display) for this purpose. To correct for changes in position of the image rendering device relative to the user's eyes due to movement of the head-mounted device on the user's face, a processor within or in communication with (e.g., via a wireless or wired link) the head-mounted device may be configured to use distance and angle measurements from a sensor configured to determine changes in distance and angle to the user's face or eyes, and adjust the rendering of an item of virtual content (e.g., augmented imagery) to account for changes in distances/angles between the head-mounted device and the eyes of the user. Such adjustments may function to stabilize the apparent location of the item of virtual content with respect to a distance real world object so that the virtual content remains in the same apparent location with respect to the observed real world as determined by the augmented reality system when the head-mounted device shifts on the user's head.

In some embodiments, the head-mounted device may be configured to determine the distance and angle (or change in distance and/or angle) between a point of registration on the head-mounted device (e.g., a distance/angle sensor) and a point of registration on the user's face (e.g., the user's eyes) about six axes or degrees of freedom, namely the X, Y, Z, roll, pitch and yaw axes and dimensions. For ease of reference the terms "position" and "change in position" are used herein as a general reference to the distance and angular orientation between the head-mounted device and the user's eyes, and is intended to encompass any dimensional or angular measurement about the six axes or degrees of freedom. For example, movement of the head-mounted device down the nose of the user will result in changes in distance along the X and Z axes (for example) as well as rotation about the pitch axis, the combination of all of which may be referred to herein as a change in position of the head-mounted device relative to the user's eyes.

Assuming the head-mounted device is rigid, there will be a constant distance and angular relationship between the outward facing image sensor, the projector or display that renders images of items of virtual content, and an inward facing sensor configured to determine the position of the head-mounted device relative to a reference point on the user's face. For example, the sensor may measure the distance (or change in distance) and angles (or change in angles) to the point on the user's face to determine the position (or change of position) along six axes or degrees of freedom. Further, a measurement of the position of the sensor relative to a point of registration on the user's face can be related through a fixed geometric transformation to both the outward facing image sensor and the projector or display. Therefore, the inward-facing distance and angle measuring sensor may be positioned anywhere on the head-mounted device, and distance and angle measurements may be used by the processor to determine the position of the head-mounted device relative to the user's eyes, and adjust the rendering of an item of virtual content so that it appears to the user to remain registered with an associated real-world object.

Various types of sensors may be used in various embodiments to determine the relative position, or change in position, of the head-mounted device relative to the user's eyes. In an example embodiment, the sensor may be an inward facing infrared sensor that generates small flashes of infrared light, detects reflections of the small flashes of infrared light off the eye of the user, and determine the distance and angle (or change in distance and/or angle) between the outward facing image sensor and the eye of the user by performing a time-of-flight measurement of the detected reflections. In another example, a single visible light camera may be configured to determine changes in distance and/or angle between the outward facing image sensor and the eye of the user based on changes in observed positions of features between two or more images. In another example, two spaced apart imaging sensors (i.e., a binocular image sensor or stereo camera) may be used to determine distance through image processing by the processor to determine the angles in each sensor to a common point of reference on the user's face (e.g., the pupil of one eye) and calculate the distance using triangulation. In another example embodiment, the sensor may be a capacitance touch sensing circuit or circuits, which may be embedded on the interior of the head-mounted device so as to make contact with a user's face (e.g., the nose bridge, brow region, or the temple area), and configured to output capacitance data that the processor may analyze to determine whether the device has moved or shifted on the user's face. In another example embodiment, the sensor may be an ultrasonic transducer that generates pulses of ultrasound, detects echoes of the ultrasound pulses off the face of the user, and determines the distance (or change in distance) between the outward facing image sensor and the user's face by performing a time-of-flight measurement of the detected echoes. Distance or change in distance may be determined based on the time between generation of the IR flash or ultrasound and the speed of light or sound. The sensor may be configured to determine an angle to the user's eyes and thus also measure a change in angular orientation of the head-mounted device (and thus the outward facing camera) and the user's eyes. The processor may then use such measurements to determine the position (or change in position) of the head-mounted device relative to the user's eye, and determine adjustments to make to the rendering of an item of virtual content so that the item appears to remain registered with an associated real-world object.

The head-mounted device processor may render the adjusted or updated image of the virtual content at the updated display location (i.e., distance and angle) to generate an augmented scene so that items of virtual content remain registered with real world objects as determined by the augmented reality system.

The term "mobile device" is used herein to refer to any one or all of cellular telephones, smartphones, Internet-of-things (TOT) devices, personal or mobile multi-media players, laptop computers, tablet computers, ultrabooks, palm-top computers, wireless electronic mail receivers, multimedia Internet enabled cellular telephones, wireless gaming controllers, head-mounted devices, and similar electronic devices which include a programmable processor, a memory and circuitry for sending and/or receiving wireless communication signals to/from wireless communication networks. While the various embodiments are particularly useful in mobile devices, such as smartphones and tablets, the embodiments are generally useful in any electronic device that includes communication circuitry for accessing cellular or wireless communication networks.

The phrase "head-mounted device" and the acronym (HID) is used herein to refer to any electronic display system that presents the user with a combination of computer-generated imagery and real-world images from a user's physical environment (i.e., what the user would see without the glasses) and/or enables the user to view the generated image in the context of the real-world scene. Non-limiting examples of head-mounted devices include, or may be included in, helmets, eyeglasses, virtual reality glasses, augmented reality glasses, electronic goggles, and other similar technologies/devices. As described herein, a head-mounted device may include a processor, a memory, a display, one or more cameras (e.g., world-view camera, gaze-view camera, etc.), one or more six degree-of-freedom triangulation scanners, and a wireless interface for connecting with the Internet, a network, or another computing device. In some embodiments, the head-mounted device processor may be configured to perform or execute an augmented reality software application.

Figure 6:
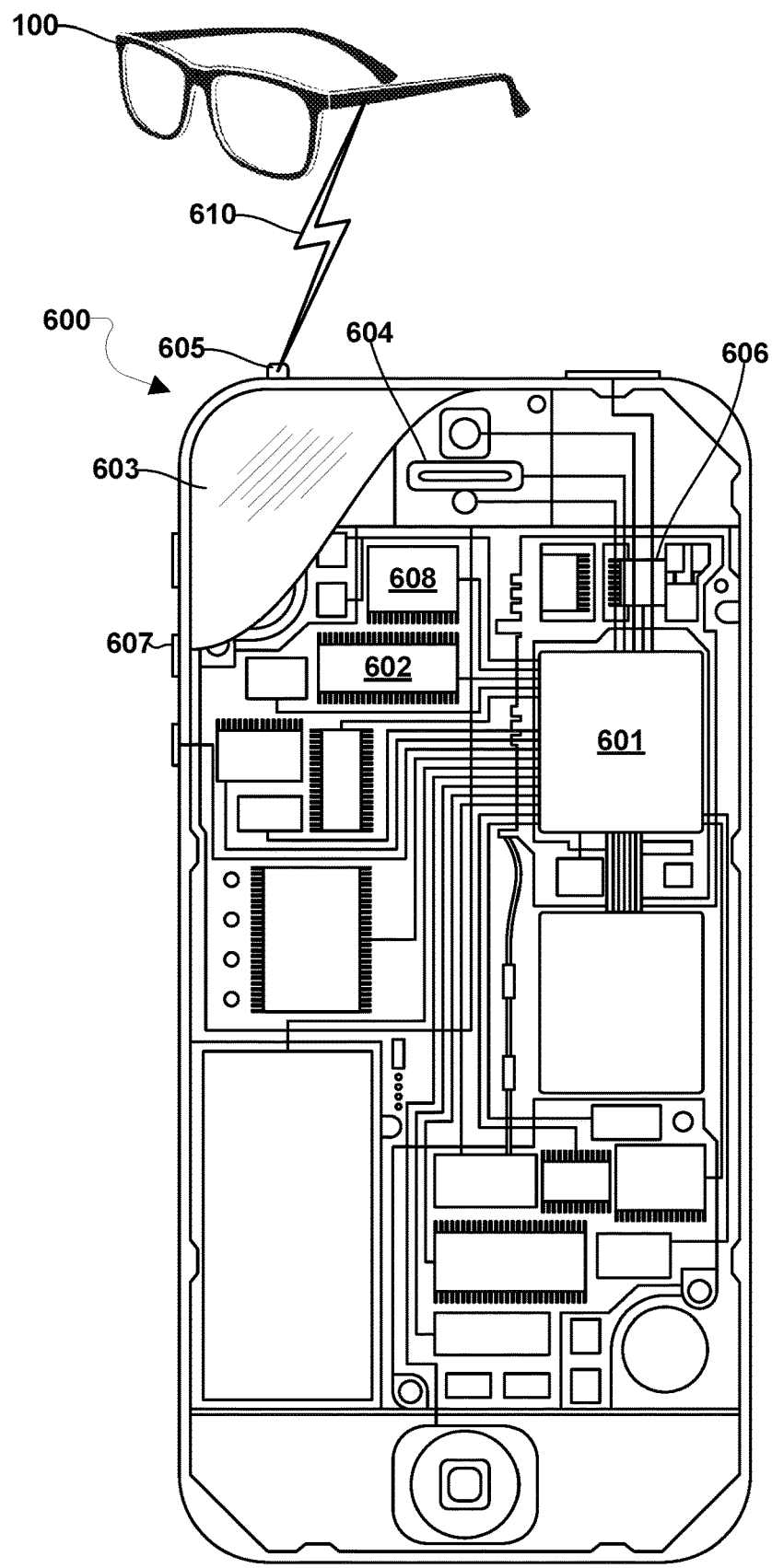
FIG. 6 is a component block diagram of mobile device suitable for implementing some embodiments.
Figure 7:
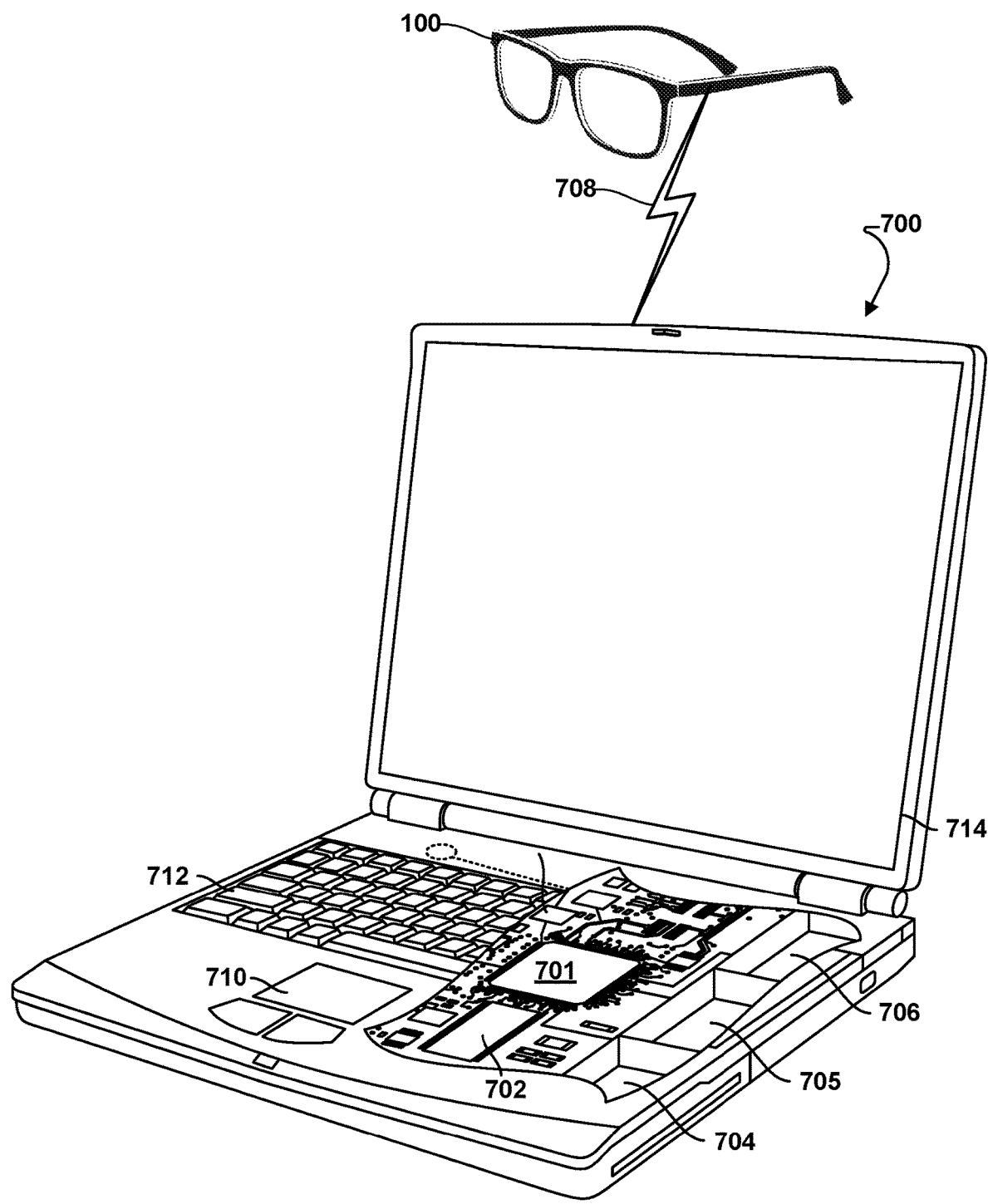
FIG. 7 is a component diagram of example computing device suitable for use with the various embodiments.

In some embodiments a head-mounted device may be an accessory for and/or receive information from a mobile device (e.g., desktop, laptop, Smartphone, tablet computer, etc.), with all or portions of the processing being performed on the processor of that mobile device (e.g., the computing devices illustrated in FIGS. 6 and 7, etc.). As such, in various embodiments, the head-mounted device may be configured to perform all processing locally on the processor in the head-mounted device, offload all of the main processing to a processor in another computing device (e.g. a laptop present in the same room as the head-mounted device, etc.), or split the main processing operations between the processor in the head-mounted device and the processor in the other computing device. In some embodiments, the processor in the other computing device may be a server in "the cloud" with which the processor in the head-mounted device or in an associated mobile device communicates via a network connection (e.g., a cellular network connection to the Internet).

The phrase "six degrees of freedom (6-DOF)" is used herein to refer to the freedom of movement of a head-mounted device or its components (relative to the eyes/head of the user, a computer-generated image or virtual object, a real-world object, etc.) in three-dimensional space or with respect to three perpendicular axes relative to the user's face. The position of a head-mounted device on a user's head may change, such as moving in a forward/backward direction or along the X-axis (surge), in a left/right direction or along the Y-axis (sway), and in an up/down direction or along the Z-axis (heave). The orientation of a head-mounted device on a user's head may change, such as rotating about the three perpendicular axes. The term "roll" may refer to rotation along the longitudinal axis or tilting side to side on the X-axis. The term "pitch" may refer to rotation along the transverse axis or tilting forward and backward on the Y-axis. The term "yaw" may refer to rotation along normal axis or turning left and right on the Z-axis.

A number of different methods, technologies, solutions, and/or techniques (herein collectively "solutions") may be used for determining the location, position, or orientation of a point on the user's face (e.g., a point on the facial structure surrounding the user's eyes, the eye, eye socket, corner of the eye, cornea, pupil, etc.), any or all of which may be implemented by, included in, and/or used by the various embodiments. As noted above, various types of sensors, including IR, image sensors, binocular image sensors, capacitance touch sensing circuits, and ultrasound sensors, may be used to measure a distance and angle from the sensor on head-mounted device to the point on the user's face. The processor may apply trilateration or multilateration to the measurements by the sensor, as well as accelerometer and gyroscope sensor data to determine changes in the position (i.e., distance and angular orientation) of the head-mounted device relative to the user's face through six degrees of freedom (DOF). For example, a head-mounted device may be configured to transmit sound (e.g., ultrasound), light or a radio signal to a target point, measure how long it takes for a reflection of the sound, light or radio signal to be detected by a sensor on the head-mounted device, and use any or all of the above techniques (e.g., time of arrival, angle of arrival, etc.) to estimate the distance and angle between a lens or camera of the head-mounted device and the target point. In some embodiments, a processor, such as the processor of the head-mounted device, may use a three-dimensional (3D) model of the user's face (e.g., a 3D reconstruction) in processing images taken by an inward-facing image sensor (e.g., a digital camera) to determine the position of the head-mounted device relative to the user's eyes.

As discussed above, an augmented reality system may use vision-based registration techniques/technologies to align a rendered image of an item of virtual content (e.g., computer-generated imagery, etc.) so that the item appears to the user to be registered with a real-world object. Thus, based on the position and orientation of the head-mounted device on the users face or head, the device projects or otherwise renders the item of virtual content so that it appears as the user expects with respect to the associated real-world object. Examples of vision-based registration techniques include optics-based registration, video-based registration, registration with artificial markers, registration with natural markers, multicamera model-based registration, hybrid registration, and registration through blur estimation.

For example, an augmented reality system may perform operations that include the head-mounted device capturing an image of a real-world scene (i.e., the physical environment surrounding the user), processing captured images to identify four known points from the image of the real-world scene, setting four separate tracking windows around the points, determining a camera calibration matrix (M) based on the points, determining "world," "camera," and "screen" coordinates for the four known points based on the camera calibration matrix (M), determining a projection matrix based on the coordinates, and using the projection matrix to sequentially overlay each of generated virtual objects onto the image of the real-world scene.

Each of the vision-based registration techniques mentioned above may include a positioning phase, a rendering phase, and a merging phase. During the positioning phase, the head-mounted device may capture images of a real-world scene (i.e., the physical environment surrounding the user) and determine the locations in which virtual objects are to be displayed in the real-world scene. During the rendering phase, the head-mounted device may generate two-dimensional images of the items of virtual content. During the merging phase, the head-mounted device may render the items of virtual content via an image rendering device (e.g., a projector or display) so the items appear to the user to be superimposed on or with the real-world scene. In particular the head-mounted device may present the superimposed image to the user so that the user can view and/or interact with the items of virtual content in a way that appears natural to the user regardless of position and orientation of the head-mounted device. In mixed reality devices that employ video pass-through techniques, the merging phase may involve rendering both images of the real world and items of virtual content together in the display.

Following or as part of the merging phase, the processor may obtain, from the inward facing distance and angle sensor, distance and/or angle measurements to a point of registration on the user's face, and adjust the rendering of the items of virtual contents to that the items of virtual content appear to remain at the same relative position (i.e., distance and angle) to the real world scene as the position and/or orientation of the head-mounted device on the user's head changes, such as when the user manually repositions the head-mounted device on the user's face.

FIG. 1A illustrates that a head-mounted device 100 that may be configured in accordance with the various embodiments. In the example illustrated in FIG. 1A, the head-mounted device 100 includes a frame 102, two optical lenses 104, and a processor 106 that is communicatively coupled to outward facing world-view image sensors/cameras 108, inward facing gaze-view sensors/cameras 110, a sensor array 112, a memory 114, and communication circuitry 116. In some embodiments, the head-mounted device 100 may include capacitance touch sensing circuits along the arms 120 of the frame or in a nose bridge 122 of the head-mounted device 100. In some embodiments, the head-mounted device 100 may also include sensors for monitoring physical conditions (e.g., location, motion, acceleration, orientation, altitude, etc.). The sensors may include any or all of a gyroscope, an accelerometer, a magnetometer, a magnetic compass, an altimeter, an odometer, and a pressure sensor. The sensors may also include various bio-sensors (e.g., heart rate monitor, body temperature sensor, carbon sensor, oxygen sensor, etc.) for collecting information pertaining to environment and/or user conditions. The sensors may also be external to the head-mounted device 100 and paired or grouped to the head-mounted device 100 via a wired or wireless connection (e.g., Bluetooth®, etc.).

In some embodiments, the processor 106 may also be communicatively coupled to an image rendering device 118 (e.g., an image projector), which may be embedded in arm portions 120 of the frame 102 and configured to project images onto the optical lenses 104. In some embodiments, the image rendering device 118 may include a light-emitting diode (LED) module, a light tunnel, a homogenizing lens, an optical display, a fold mirror, or other components well known projectors or head-mounted displays. In some embodiments (e.g., those in which the image rendering device 118 is not included or used), the optical lenses 104 may be, or may include, see-through or partially see-through electronic displays. In some embodiments, the optical lenses 104 include image-producing elements, such as see-through Organic Light-Emitting Diode (OLED) display elements or liquid crystal on silicon (LCOS) display elements. In some embodiments, the optical lenses 104 may include independent left-eye and right-eye display elements. In some embodiments, the optical lenses 104 may include or operate as a light guide for delivering light from the display elements to the eyes of a wearer.

The outward facing or world-view image sensors/cameras 108 may be configured to capture real-world images from a user's physical environment, and send the corresponding image data to the processor 106. The processor 106 may combine the real-world images with computer-generated imagery or virtual objects (VOs) to generate an augmented scene, and render the augmented scene on the electronic displays or optical lenses 104 of the head-mounted device 100.

The inward facing or gaze-view sensors/cameras 110 may be configured to acquire image data from the user's eyes or the facial structure surrounding the user's eyes. For example, the gaze-view sensors/cameras 110 may be configured to produce small flashes of light (infrared light, etc.), capture their reflections off the user's eyes (e.g., eye socket, corner of the eye, cornea, pupil, etc.), and send the corresponding image data to the processor 106. The processor 106 may use the image data received from the gaze-view sensors/cameras 110 to determine an optical axis for each of the user's eyes, the gaze direction of each eye, the user's head orientation, various eye gaze velocity or acceleration values, changes in angles of eye gaze direction, or other similar gaze-related information. In addition, the processor 106 may use the image data received from the gaze-view sensors/cameras 110 and/or other sensors components in the head-mounted device 100 (e.g., the capacitance touch sensing circuits) to determine distances and angles between each of the user's eyes and world-view image sensors/cameras 108 or optical lenses 104.

In some embodiments, the head-mounted device 100 (or the inward facing or gaze-view sensors/cameras 110) may include scanners and/or trackers configured to determine distances and angles between each of the user's eyes and world-view image sensors/cameras 108 or optical lenses 104. A scanner/tracker may be configured to measure the distance and angle to a point of registration on the user's face (e.g., a point on the user's eyes or the facial structure surrounding the user's eyes). Various types of scanners or trackers may be used. In an example embodiment, the scanner/tracker may be an inward facing binocular image sensor that images the user's face or eyes and determines distance and angles to the point of registration through triangulation. In another example embodiment, the scanner/tracker may be a IR sensor that is configure to project a laser beam toward the point or registration and determine the coordinates of the point of registration by measuring a distance (e.g., by measuring time of flight of reflected IR flashes) and two angles between the scanner/tracker and point (e.g., via an absolute distance meter, interferometer, angular encoder, etc.). In some embodiments, the scanner/tracker may include an ultrasound transducer (e.g., a piezoelectric transducer) that is configured to perform time-of-flight measurements by emitting ultrasound toward a surface of the user's eyes or facial feature surrounding the user's eyes, measuring the time between sound pulses and detect echoes, and determining the distance based on the measured time of flight.

In some embodiments, the scanner/tracker may be or include a triangulation scanner that is configured to determine the coordinates of an object (e.g., the user's eyes or the facial structure surrounding the user's eyes) based on any of a variety of image triangulation techniques known in the art. Generally, a triangulation scanner projects either a line of light (e.g., light from a laser line probe) or a two-dimensional (2D) pattern of light over an area (e.g., structured light) onto the object surface. A triangulation scanner may include a camera coupled to a light source (e.g., an IR light emitting diode laser) in a fixed mechanical relationship to the outward facing camera on the head-mounted device. The projected line or pattern of light emitted from the light source may be reflected off a surface on the user's face (e.g., one or both of the user's eyes) and imaged by the camera. Since the camera and light source are arranged in a fixed relationship to each other, the distance and angles to the object surface may be determined from the projected line or pattern, the captured camera images and a baseline distance separating the light source and the camera according to trigonometric principles.

In some embodiments, the scanner/tracker may be configured to acquire a series of images, and register the images relative to one another so that the position and orientation of each image relative to the other images is known, use features (e.g., cardinal points) located in the images to match overlapping areas of adjacent image frames, and determine distances and angles between each of the user's eyes and world-view image sensors/cameras 108 or optical lenses 104 based on the overlapping areas.

In some embodiments, the processor 106 of the head-mounted device 100 may be configured to use localization and mapping techniques, such as simultaneous localization and mapping (SLAM), visual simultaneous localization and mapping (VSLAM), and/or other techniques known in the art to construct and update a map of the viewable environment and/or determine distances and angles between each of the user's eyes, each of the optical lenses 104, and/or each of the world-view image sensors/cameras 108. For example, the world-view image sensors/cameras 108 may include a monocular image sensor that captures images or frames from the environment. The head-mounted device 100 may identify prominent objects or features within the captured image, estimate the dimensions and scale of the features in the image, compare the identified features to each other and/or to features in test images having known dimensions and scale, and identify correspondences based on the comparisons. Each correspondence may be a value set or an information structure that identifies a feature (or feature point) in one image as having a high probability of being the same feature in another image (e.g., a subsequently captured image). Said another way, a correspondence may be a set of image points (e.g., a first point in a first image and a second point in a second image, etc.) that are in correspondence. The head-mounted device 100 may produce a homography matrix information structure based on the identified correspondences, and use the homography matrix to determine its pose (e.g., position, orientation, etc.) within the environment.

Figure 1B:
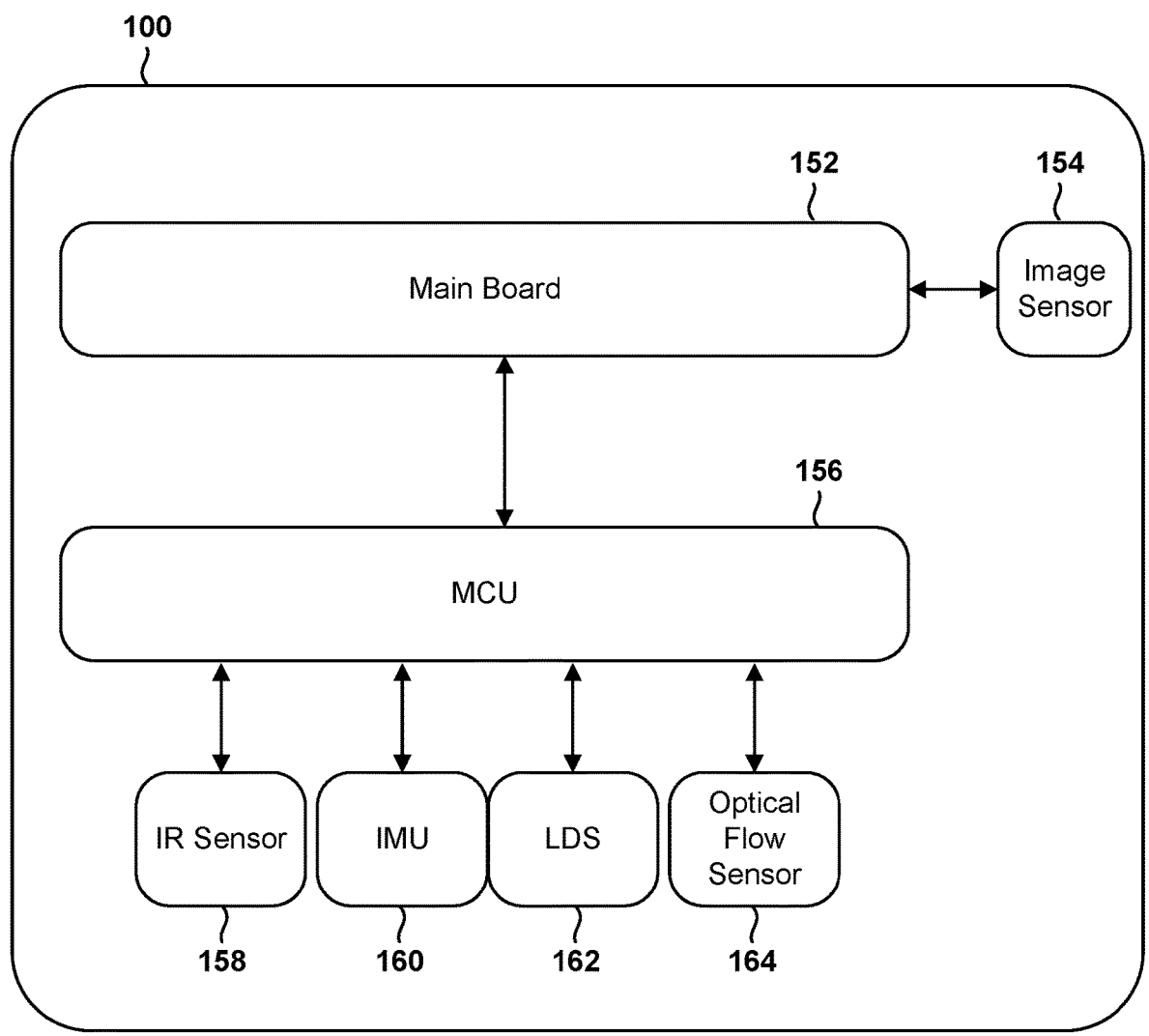
FIG. 1B is a system block diagram that illustrates the computer architecture and sensors that could be included in a head-mounted device that is configured to perform vision-based registration operations that account for changes in distances/angles between the cameras of the head-mounted device and the eyes of the user in accordance with various embodiments.

FIG. 1B illustrates a computer architecture and various sensors that may be included in a head-mounted device 100 that is configured to account for changes in distances/angles between the cameras of the head-mounted device and the eyes of the user in accordance with some embodiments. In the example illustrated in FIG. 1B, the head-mounted device 100 includes a main board component 152, an image sensor 154, a microcontroller unit (MCU) 156, an infrared (IR) sensor 158, an inertial measurement unit (IMU) 160, a laser distance and angle sensor (LDS) 162, and an optical flow sensor 164.

The sensors 154, 158-164 may gather information that is useful for employing SLAM techniques in the head-mounted device 100. For example, the optical flow sensor 164 may measure optical flow or visual motion, and output measurements based on the optical flow/visual motion. An optical flow may identify or define the pattern of apparent motion of objects, surfaces, and edges in a visual scene caused by the relative motion between an observer (e.g., head-mounted device 100, user, etc.) and a scene. The optical flow information may be used by the MCU 156 to determine visual motion or relative motion between the head-mounted device 100 and real-world objects in the vicinity of the head-mounted device 100. Based on the visual or relative motion of real-world objects, the processor may determine the distance and angle to real world objects using SLAM techniques. By determining the distance and angle to real world objects, the augmented reality system may determine the virtual distance at which to render items of virtual content so that they appear at the same distance (i.e., focus) as a real world object with which the virtual content is to be registered. In some embodiments, the optical flow sensor 164 may be an image sensor that is coupled to the MCU 156 (or processor 106 illustrated in FIG. 1A) that is programmed to run an optical flow algorithm. In some embodiments, the optical flow sensor 164 may be vision chip that includes the image sensor and processor on the same chip or die.

The head-mounted device 100 may be equipped with a variety of additional sensors, including a gyroscope, accelerometers, a magnetometer, a magnetic compass, an altimeter, a camera, an optical reader, an orientation sensor, a monocular image sensor, and/or similar sensors for monitoring physical conditions (e.g., location, motion, acceleration, orientation, altitude, etc.) or gathering information that is useful for employing SLAM techniques.

Figure 2A:
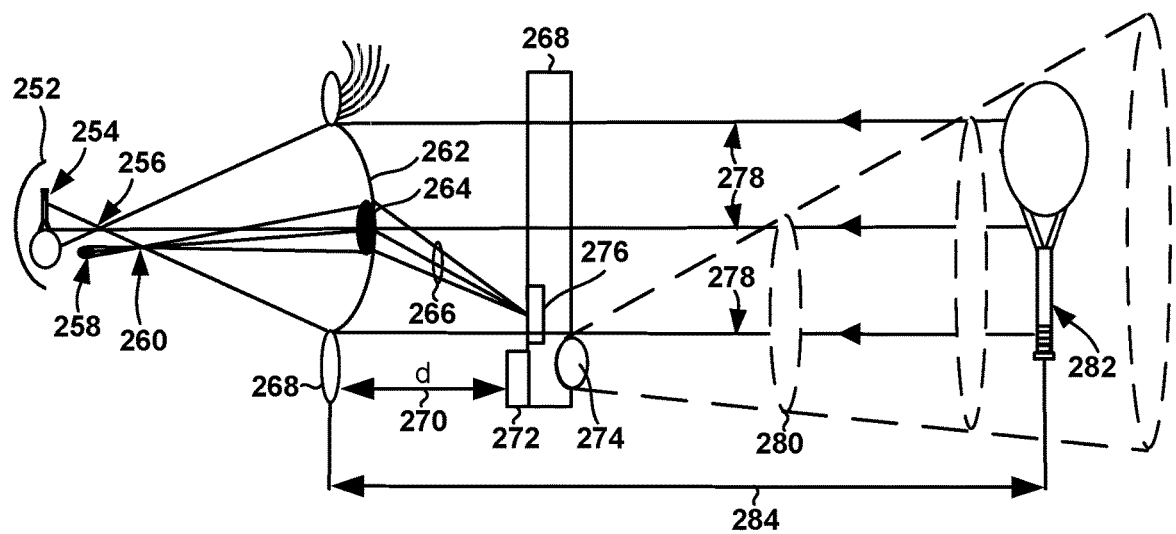
FIGS. 2A-2E are illustrations of imaging systems suitable for displaying electronically generated images or items of virtual content on a heads-up display system.

FIG. 2A illustrates an imaging system suitable for rendering electronically generated images or items of virtual content on a head-mounted device as part of an augmented reality system. The example illustration in FIG. 2A includes a user's retina 252, real-world object retina image 254, the eye focal point 256, an item of virtual content (virtual ball) retina image 258, an item of virtual content focal point 260, the user's eye 262 (e.g., eye lens, pupil, cornea, etc.), the user's iris 264, light projections 266 for the item of virtual content, a surface or facial feature 268 surrounding the user's eye, a sensor 272 for measuring a distance (d) 270 and angle between the sensor 272 and the facial feature 268, image sensor lens 274, an image rendering device 276, light from real-world object 278, a field of view (FOV) cone 280 of the image sensor lens 274, and a real-world object 282. In some embodiments, the image rendering device 276 may be a projector or display (e.g., a waveguide, laser projector, etc.) configured to render images of an item of virtual content so as to appear at a distance of and close to a real-world object.

Figure 2B:
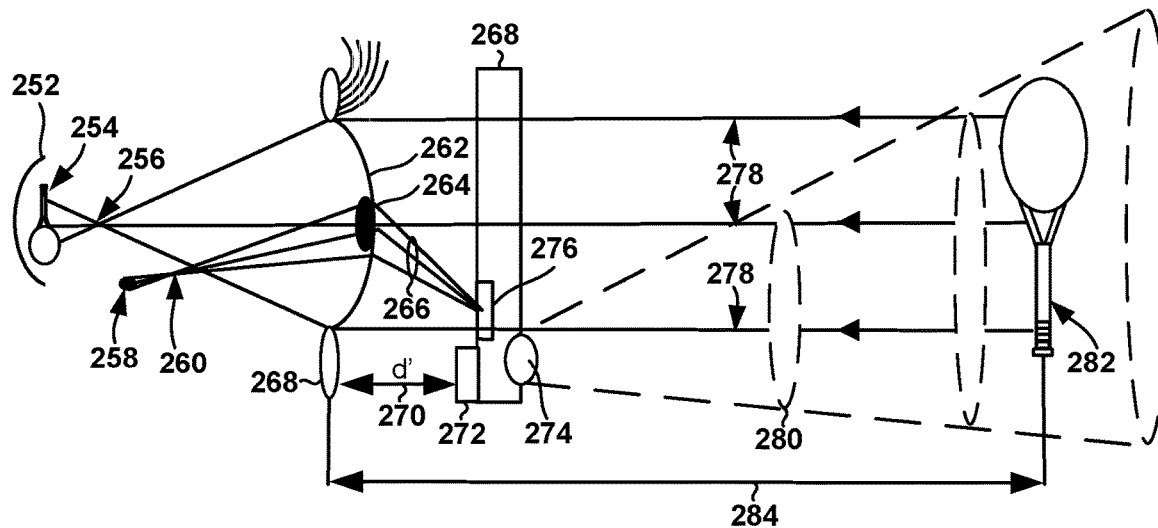

FIG. 2B illustrates that when a user adjusts the position of the head-mounted device on the user's face, or when the head-mounted device shifts on the user's nose, the distance (d') 270 between the sensor 272 and the facial feature 268 changes. While movement of the head-mounted device on the user's face changes the position (e.g., distance and/or angle) of the image rendering device 276 relative to the user's eye 262 and face 268, which changes the perceived location of the item of virtual content 258, there is no change in the distance D 284 to the real world object 282. Thus, the perceived location of the real world 282 object (which is related to the location of the object image 254 on the retina 252) remains unchanged, but the change in position of the image rendering device 276 relative to the user's eye 262 and face 268 alters the location in which the user perceives the item of virtual content (virtual ball) as the virtual content retina image 258 changes relative to the real-world object retina image 254.

Figure 2C:
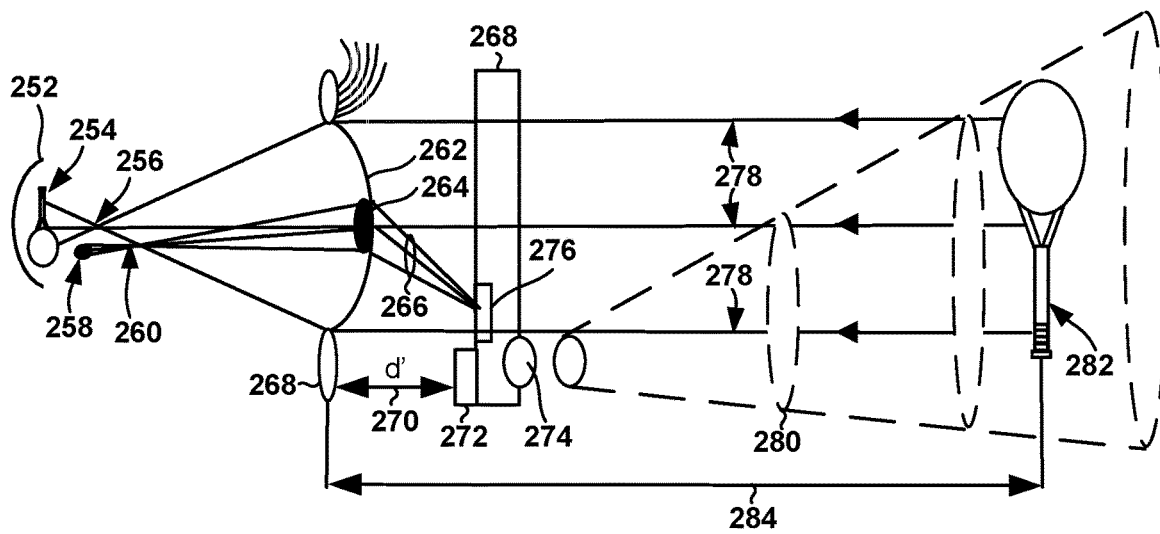

FIG. 2C illustrates that a system configured to performing vision-based adjustments in accordance with various embodiments may determine a position (or change in position) of the image sensor 274 relative to the eye 262, and adjust the rendering of the item of virtual content 258 based on the position or change in position so that the virtual content appears stable with respect to the real world object and natural to the user regardless of the position of the head-mounted device on the user's head.

In some embodiments, the system may be configured to determine a new distance (d') 270 (or a change in distance) between the sensor 272 and the eye 262 of the user (or another point of reference on the user's face) by a variety of techniques, such as measuring time of flight of IR flashes or ultrasound pulses, triangulation of images obtained from a binocular image sensor. The system may adjust the rendering of the item of virtual content 258 based on the determined distance or change in distance between the image sensor and the eye of the user so that the item of virtual content (ball in the figure) again appears (i.e., the retina image) registered with the real world object (racket in the figure) because the ball's retina image 258 is at the same focal distance and next to the real world object's retina image 254.

Figure 2D:
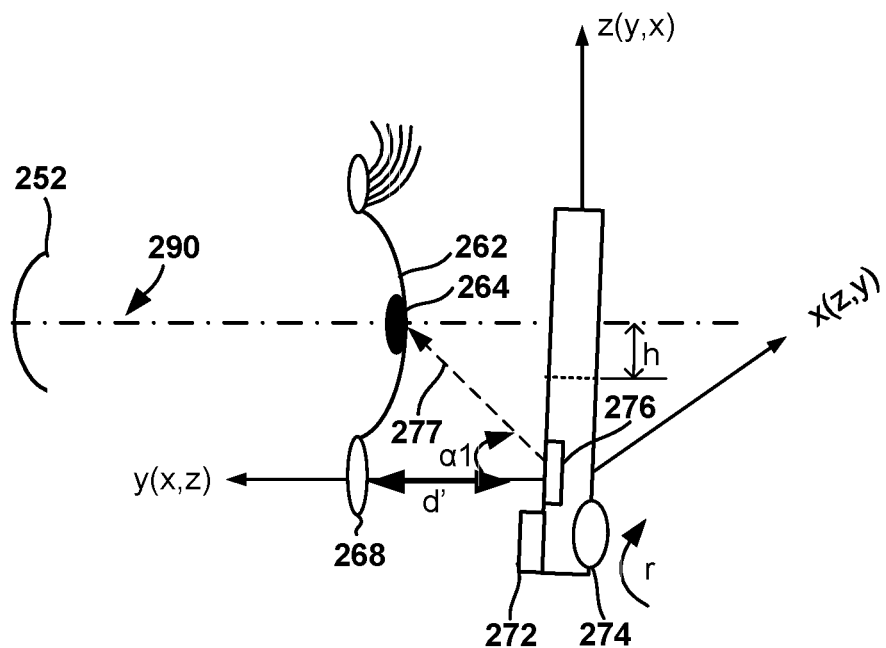
Figure 2E:
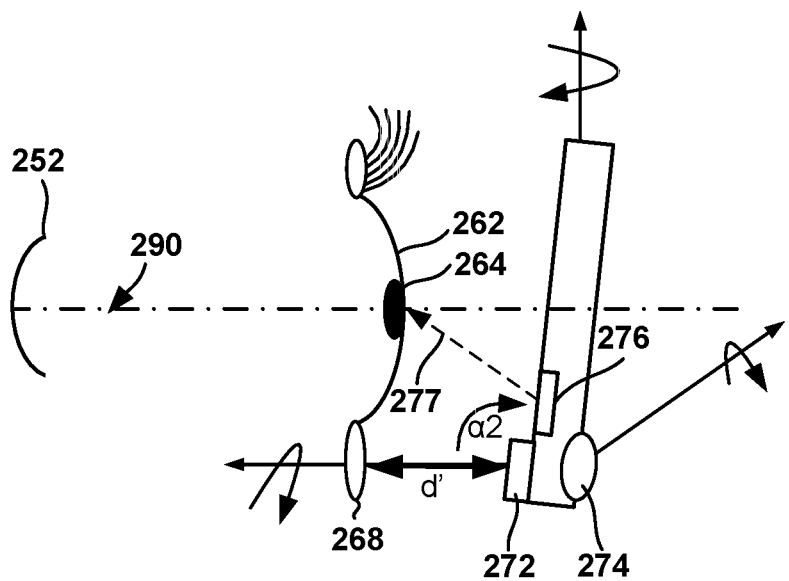

FIGS. 2D and 2E illustrate that in some embodiments, determining the position of the image sensor 274 relative to the eye 262 of the user may include determining a change in angular orientation of the image rendering device 276 due to movement of the head-mounted device on the user's face. For example, as illustrated in FIG. 2D, as the head-mounted device slips down the user's nose, the separation distance d' will change and the vertical orientation of the head-mounted device will drop relative to the centerline 290 of the user's eye 262 by height h, thus causing a change around the pitch axis. As a consequence of the vertical distance change h, the angle of projection 277 from the image rendering device 276 to the iris 264 will change by an amount a1, which will further change the apparent location of an item of virtual content unless the rendering of the virtual content is adjusted. As a further example, as illustrated in FIG. 2E, if the head-mounted device rotates on or about the user's face, the angle between the angle of projection 277 from the image rendering device 276 to the iris 264 will change by an amount a2, which will also change the apparent location of an item of virtual content unless the rendering of the virtual content is adjusted.

In some embodiments, such as embodiments in which the inward focused sensor 272 is a binocular image sensor, the sensor may also be configured to measure vertical translations and rotational changes based on angular changes in the position of the user's eye(s) 262 (or another point of registration on the user's face correlated to the eyes) relative to the sensor 272. For example, the measurement of vertical translation and rotational changes may be determined through image processing that identifies features or spots on the user's face that are recognized in multiple images (e.g., the iris, a corner of an eye, a mole, etc.), and tracks the change in apparent position of the feature over multiple images and from both image sensors, and uses trigonometry to determine the distance from the sensor to the eyes as well as rotational movements of the head-mounted device relative to the user's eyes (i.e., changes in projection angle and distance). In some embodiments, rotational change measurements may be obtained by different sensors on the head-mounted device. By determining such changes in position and orientation of the image rendering device 276 relative to the user's eyes, the processor can apply one or more trigonometric transforms to appropriately adjust the rendering of the item of virtual content.

Figure 3:
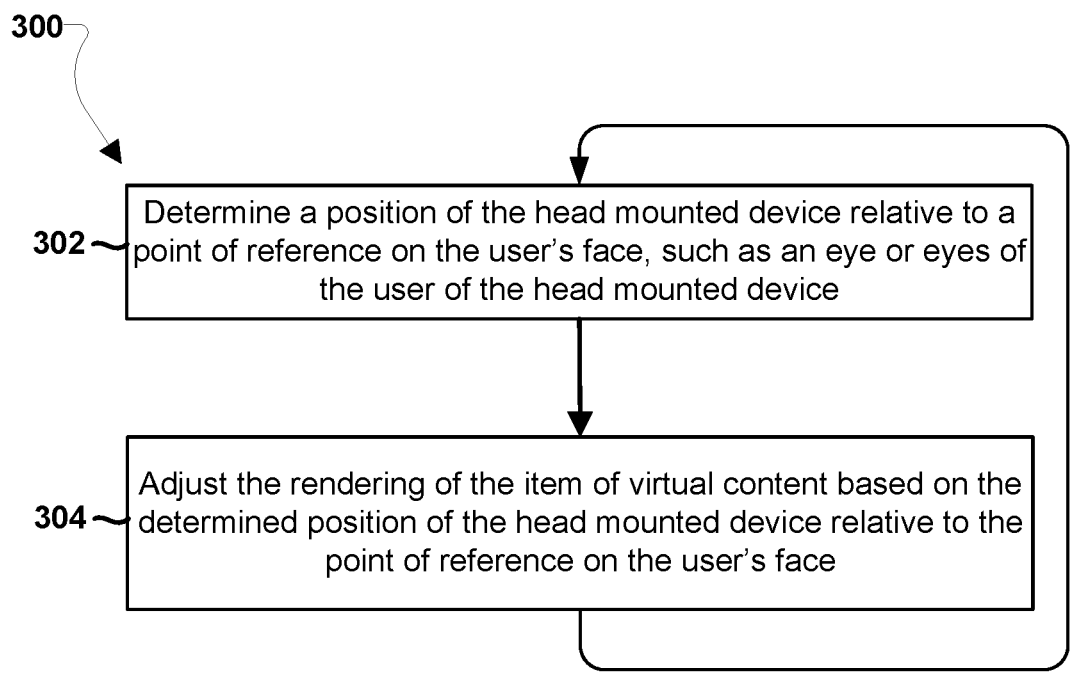
FIGS. 3-5 are processor flow diagrams illustrating additional methods of performing vision-based registration operations that account for changes in distances/angles between the cameras of the head-mounted device and the eyes of the user in accordance with various embodiments.

FIG. 3 illustrates a method 300 of adjusting the rendering of an item of virtual content in a head-mounted device to account for changes in position (e.g., distances/angles) of the head-mounted device relative to the eyes of the user according to some embodiments. All or portions of the method 300 may be performed by components or processors in a head-mounted device (e.g., processor 106) or a processor in another computing device (e.g., devices illustrated in FIGS. 6 and 7).

Prior to initiation of the method 300, an augmented reality system, such as implemented in the head-mounted device, may capture an image of a real-world scene from the physical environment surrounding the head-mounted device using an outward facing image sensor. The captured image may include surfaces, people and objects that are physical present in the user's field of view. The augmented reality system may process the captured images to identify a location of a real-world object or surface in the captured image of a real-world scene. For example, the augmented reality system may perform image processing operations to identify prominent objects or features within the captured image, estimate the dimensions and scale of the features in the image, compare the identified features to each other and/or to features in test images having known dimensions and scale, and identify correspondences based on the comparisons. As part of such operations, the augmented reality system may produce a homography matrix information structure based on the identified correspondences, and use the homography matrix to identify the location of the real-world object or surface in the captured image. The augmented reality system may generate an image of a virtual object and determine a display location for the virtual object based on the location of the real-world object or surface.

In block 302, the head-mounted device processor may process information received from an inward facing sensor to determine a position (or a change in position) of the head-mounted device relative to a point of reference on the face of the user of the head-mounted device. In some embodiments, the point of reference on the user's face may be a facial feature that has a fixed location relative to the user's eyes. In some embodiments, the point of reference may be an eye or both eyes of the user. As described, if the head-mounted device is rigid, the position of a sensor with respect to the virtual content image rendering device and the image plane of an outward facing imaging sensor will be fixed, so a change in distance and angle measured by a sensor on any position on the head-mounted device will translate to an equivalent change in distance and angle between the virtual content image rendering device and the image plane of an outward facing imaging sensor. Similarly, because the features on a user's face are generally in fixed positions relative to the user's eyes, the sensor may provide to the processor information indicative of a position of the head-mounted device relative to any of a variety of points of registration on the user's face, such as one or more of the user's, eyes (or parts of the eyes), cheek, eye brow, nose, etc., as any change will translate to an equivalent change in distance and angle to the user's eyes. For example, the information received by the processor from the sensor may relate to a position of the head-mounted device relative to an eye or both eyes of the user.

As described herein, any of a variety of sensors may be used to make the measurements used by the processor in block 302. For example, in some embodiments, the head-mounted device processor may cause an inward facing image sensor to provide information relating to the relative position (e.g., in terms of distance and angles) of the head-mounted device or an image rendering device relative to the user's eyes or surrounding facial structures using image processing (such as tracking the location or relative movement of a feature on the user's face from one image to the next). In some embodiments, an inward facing sensor may be combined or coupled to an IR emitter (e.g., an IR LED laser), which may be configured to emit flashes of IR light, and the sensor may be configured to detect scattering of the IR light and provide information relating to the relative position (e.g., in terms of distance and angle) of the head-mounted device or an image rendering device relative to the user's face or eyes based on time of flight measurements between when an IR flash is emitted and the scattered light is detected. An IR imaging sensor may also provide information relating to the relative position (e.g., angles) of the head-mounted device or an image rendering device relative to the user's eyes based on image locations of reflected (vs. scattered) light from the eyes. In some embodiments, the processor may cause a piezoelectric transducer to emit a sound pulse, such as an ultrasound pulse, and record the time of an echo from the user's eyes or surrounding facial structures to determine a time of flight from which the relative distance between the sensor and the user's face may be calculated. The head-mounted device processor may determine the position of the outward facing image sensor relative to the eyes of the user in block 302 based on time-of-flight measurement information provided by the sensor. In some embodiments, the sensor may be a binocular image sensor and the processor may use a triangulation operation and/or a 6-DOF computation based on the information obtained by the inward facing sensor to determine the position of the head-mounted device relative to a point of reference (e.g., an eye or the eyes of the user) on the user's face. In some embodiments, the sensor may use a 3D rendering of the user's face in processing images obtained by an image sensor to determine the position of the head-mounted device relative to the user's eyes. In some embodiments, the sensor may be a capacitance touch sensing circuit or circuits, which may be embedded on the interior of the head-mounted device so as to make contact with a user's face (e.g., the nose bridge, brow region, or the temple area), and configured to output capacitance data that the processor may analyze to determine whether the device has moved or shifted on the user's face.

In block 304, the head-mounted device processor may determine and apply an adjustment (e.g., in focus and/or location) to the rendering of the item of the virtual content or the display location for the virtual object by the image rendering device based on the position (or change in position) of the head-mounted device relative to the point of reference on the user's face (e.g., the eyes of the user) determined in block 302. In some embodiments, the processor may be configured to determine and apply an adjustment (e.g., in focus and/or location) to the rendering of the item of the virtual content or the display location for the virtual object by the image rendering device based on the position (or change in position) of the image rendering device relative to one or both eyes of the user. The processor may adjust the virtual content rendering to account for changes in the position, orientation, distance and/or angle between the outward facing camera of the head-mounted device, the eyes of the user, and the image rendering device (e.g., projector or display) of the head-mounted device. For example, adjustments to the virtual content rendering may adjust for changes in distance and height (relative to the eye centerline) of the image rendering device as the nose bridge of the head-mounted device slides down the nose of the user. As another example, adjustments to the virtual content rendering may adjust for rotational changes in projection angles due to movement on the face of the user of a head-mounted device with a thin or lightweight frame.

The processor may repeat the operations in blocks 302 and 304 continuously, periodically or episodically triggered by an event so as to frequently adjust the rendering of the item of virtual content so that the image appears to remain stable with respect to the real world despite movement of the head-mounted device on the user.

Figure 4:
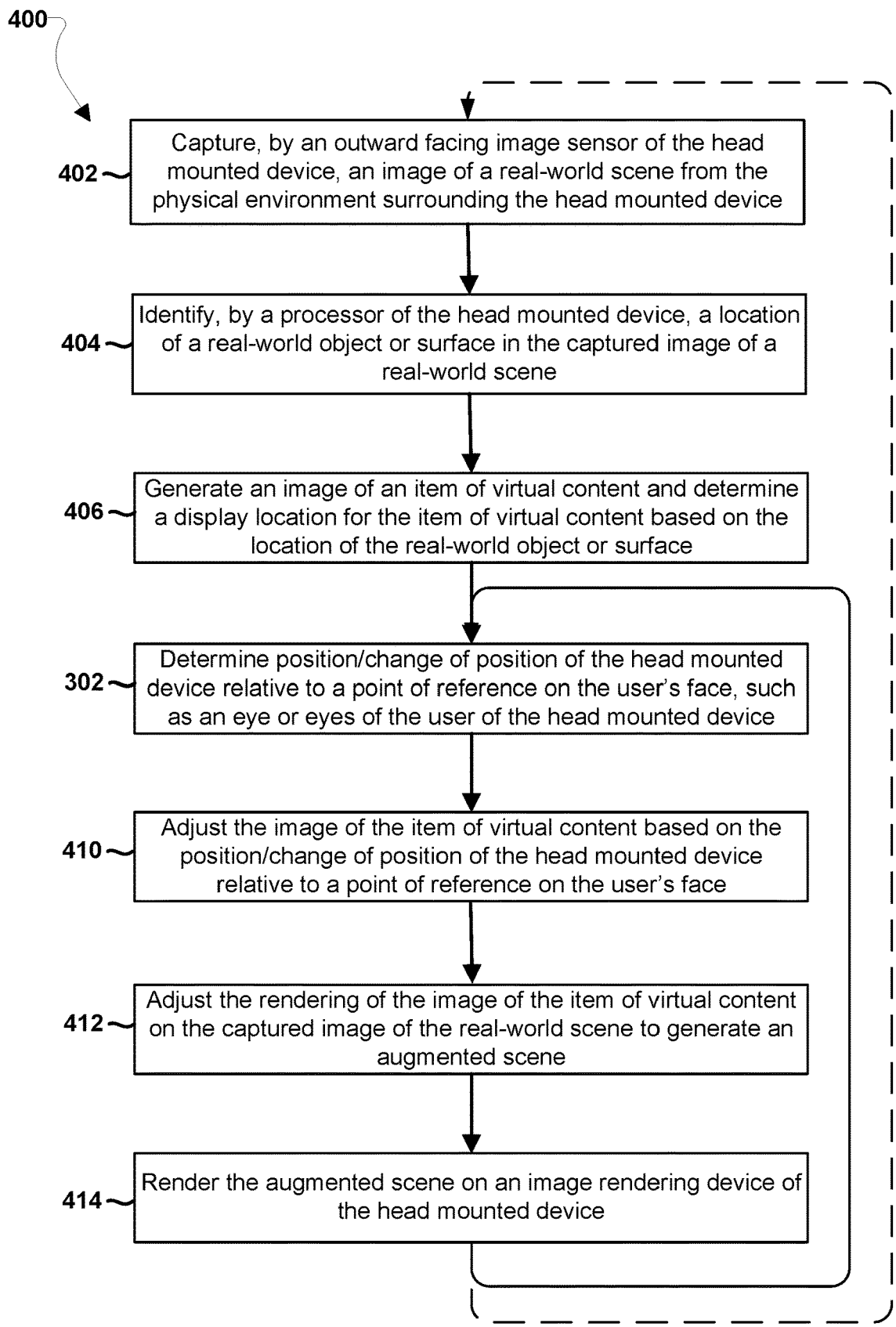

FIG. 4 illustrates a method 400 of performing vision-based registration operations that account for changes in position (i.e., distances/angles) of the head-mounted device relative to the eyes of the user according to some embodiments. All or portions of the method 400 may be performed by components or processors in a head-mounted device (e.g., processor 106) or a processor in another computing device (e.g., devices illustrated in FIGS. 6 and 7).

In block 402, an outward facing image sensor of the head-mounted device may capture an image of a real-world scene from the physical environment surrounding the head-mounted device. The captured image may include surfaces, people and objects that are physical present in the user/wearer's field of view. Captured images may be provided to a head-mounted device processor as part of the operations in block 402.

In block 404, the head-mounted device processor may process the captured images to identify a location of a real-world object or surface in the captured image of a real-world scene to which one or more items of virtual content may be correlated in an augmented reality scene. For example, the head-mounted device 100 may perform image processing operations to identify prominent objects or features within the captured image, estimate the dimensions and scale of the features in the image, compare the identified features to each other and/or to features in test images having known dimensions and scale, and identify correspondences based on the comparisons. As part of identifying the locations of real-world objects or surfaces in block 404, the processor may determine distances to such objects or surfaces using known methods, such as VSLAM or binocular trilateration if the sensor is binocular. Also as part of the operations in block 404, the head-mounted device 100 may produce a homography matrix information structure based on the identified correspondences, and use the homography matrix to identify the location of the real-world object or surface in the captured image.

In block 406, the head-mounted device processor may generate an image of a virtual object and determine a display location for the virtual object based on the location of the real-world object or surface as part of generating an augmented reality scene. The head-mounted device processor may perform the operations in block 406 as part of a positioning phase of vision-based registration in an augmented reality process.

In block 302, the head-mounted device processor may process information received from an inward facing sensor to determine a position (or change of position) of the head-mounted device relative to a point of reference on the user's face, such as an eye or eyes of the user of the head-mounted device, as described for the like numbered block of the method 300.

In block 410, the head-mounted device processor may adjust the image of the item of virtual content based on the determined position of the outward facing image sensor or the image rendering device on the head-mounted device relative to one or both eyes of the user. The processor may adjust the image (e.g., shrink, enlarge, rotate, translate, etc.) to account for the subtle movements and adjustments that change the relative positions and orientations (e.g., in terms of distances and angles) between the camera of the head-mounted device, the eyes of the user, and the electronic display of head-mounted device. For example, such adjustments may compensate for when the nose bridge of the head-mounted device slides down the nose of the user, a thin or lightweight frame of the head-mounted device moves or shifts on the face of the user, or the user manually adjusts the location, position and/or orientation of the head-mounted device on the user's nose or face.

In block 412, the head-mounted device processor may adjust the rendering of the adjusted image of the item of virtual content so that the content appears registered with (e.g., adjacent to or superimposed on) the real-world scene at the same focal depth of a real-world object. The head-mounted device processor may perform the operations in block 412 as part of the merging phase of a vision-based registration process.

In block 414, the head-mounted device processor may render the augmented scene using the image rendering device of the head-mounted device. For example, the image rendering device may be a projector (e.g., a laser projector or waveguide) that projects an image of the item of virtual content on a lens of the head-mounted device or into the eye of the user such that the virtual content is in focus with and appears nearby an associated distant real world object. The head-mounted device processor may perform the operations in block 414 as part of the rendering phase of vision-based registration for an augmented reality scene. The head-mounted device may present the superimposed image to the user in block 414 so that the user can view and/or interact with the virtual objects.

The processor may repeat the operations in blocks 302 and 410-414 continuously, periodically or episodically triggered by an event so as to frequently adjust the rendering of the item of virtual content so that the image appears to remain stable with respect to the real world despite movement of the head-mounted device on the user. Also, processor may repeat the method 400 periodically or episodically triggered by an event to update the augmented reality scene, such as to add, remove or change items of virtual content, as well as adjust the apparent position of items of virtual content with respect to real world objects as the user moves through the environment.

Figure 5:
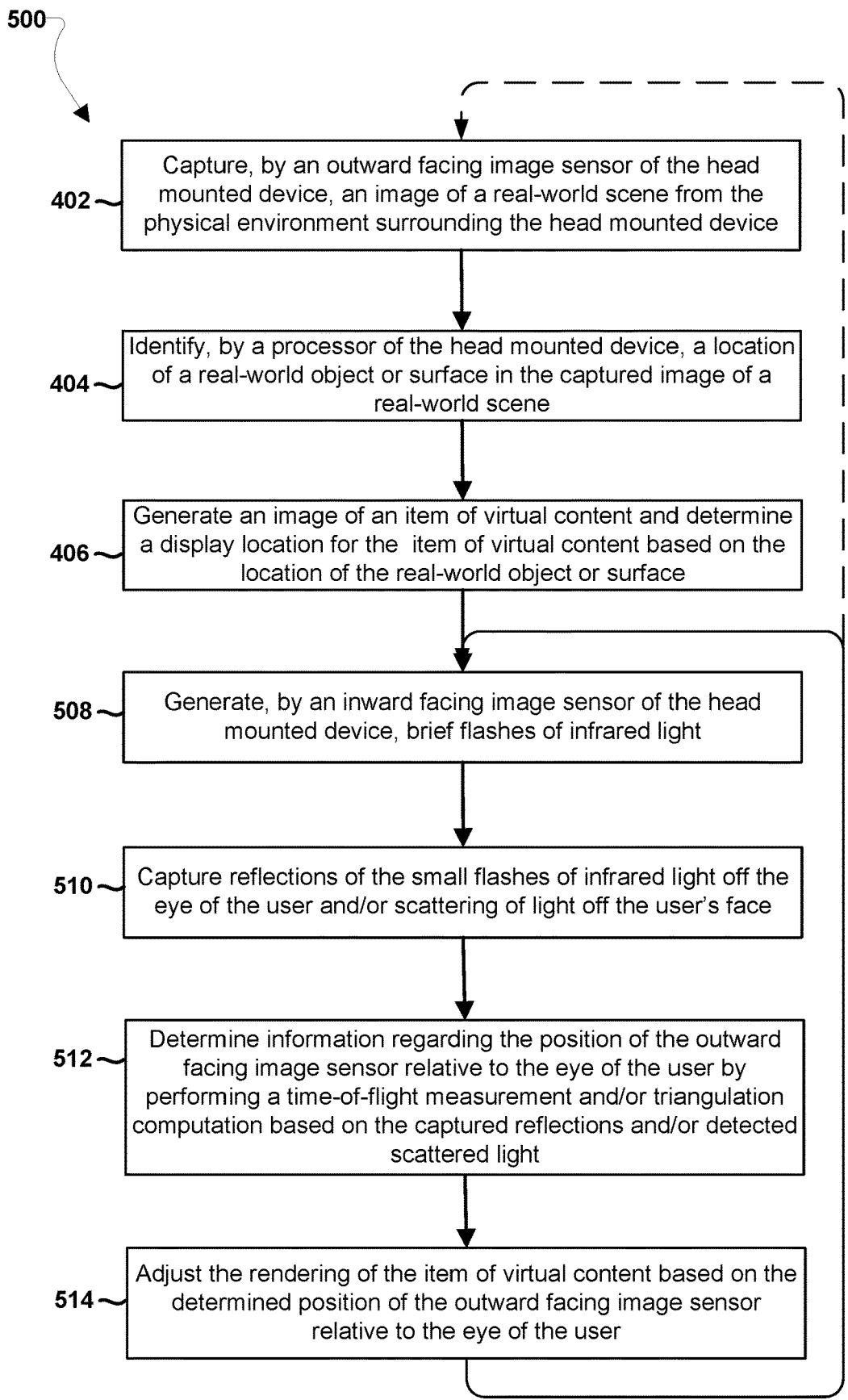

FIG. 5 illustrates a method 500 of performing vision-based registration operations that account for changes in distances/angles between the outward facing camera(s) of the head-mounted device and the eyes of the user/wearer according to some embodiments. All or portions of the method 500 may be performed by components or processors in a head-mounted device (e.g., processor 106) or a processor in another computing device (e.g., devices illustrated in FIGS. 6 and 7). In blocks 402-406, the head-mounted device processor may perform the same or similar operations as in like numbered blocks of the method 400 described with reference to FIG. 4.

In block 508, the head-mounted device processor may communicate with an inward facing image sensor of the head-mounted device to cause the inward facing image sensor to generate brief flashes of infrared light towards the eye of the user. The inward facing gaze-view sensors/cameras may be configured to capture images of the user's eyes, and perform trigonometric computations to determine the distances to and angles between each eye (or cornea, pupil, etc.) and the outward facing camera(s) (e.g., world-view camera, gaze-view camera) and/or the image rendering device (e.g., projector or display) of the head-mounted device.

In block 510, the head-mounted device processor may receive information received from the inward facing image sensor as it captures reflections or scattering of the brief flashes of infrared light off the eye or surrounding facial features of the user. The reflections may be captured by the inward facing gaze-view sensor(s)/camera(s) or another sensor in the head-mounted device.

In block 512, the head-mounted device processor may use information received from a sensor to determine the position of the outward facing camera(s) relative to one or both eyes of the user by performing a time-of-flight measurement and/or trigonometric computations based on the captured reflected and/or scattered light. For example, the head-mounted device processor may process information received from the sensor relating a position of the head-mounted device relative to the eyes of the user to determine the surge, sway, heave, roll, pitch and yaw (or their respective deltas) movements of the head-mounted device or facing image sensor relative to the eyes of the user.

In block 514, the head-mounted device processor may adjust the rendering of the virtual object based on the determined position of the outward facing image sensor relative to one or both eyes of the user. The head-mounted device processor may perform the operations in block 514 as part of the rendering phase of the vision-based registration for an augmented reality scene. The head-mounted device may present the superimposed image to the user in block 514 so that the user can view and/or interact with the virtual objects.

The processor may repeat the operations in blocks 508-514 continuously, periodically or episodically triggered by an event so as to frequently adjust the rendering of the item of virtual content so that the image appears to remain stable with respect to the real world despite movement of the head-mounted device on the user. Also, processor may repeat the method 500 periodically or episodically triggered by an event to update the augmented reality scene, such as to add, remove or change items of virtual content, as well as adjust the apparent position of items of virtual content with respect to real world objects as the user moves through the environment.

Various embodiments may be implemented on a variety of mobile devices, an example of which in the form of a smartphone is illustrated in FIG. 6. For example, images captured by an imaging sensor of the head-mounted device 100 may be wirelessly transmitted (e.g., via a Bluetooth or WiFi wireless communication link 610) to a smartphone 600 where a processor 601 may perform a portion of the processing in any of the methods 200, 300, 400 and 500 and then transmit results back to the head-mounted device 100. A smartphone 600 may include a processor 601 coupled to internal memory 602, a display 603, and to a speaker 604. Additionally, the smartphone 600 may include an antenna 605 for sending and receiving wireless signals 610 that may be connected to a wireless data link and/or cellular telephone transceiver 606 coupled to the processor 601. Smartphones 600 typically also include menu selection buttons or rocker switches 607 for receiving user inputs.

A typical smartphone 600 also includes a sound encoding/decoding (CODEC) circuit 608, which digitizes sound received from a microphone into data packets suitable for wireless transmission and decodes received sound data packets to generate analog signals that are provided to the speaker to generate sound. Also, one or more of the processor 601, wireless transceiver 606 and CODEC 608 may include a digital signal processor (DSP) circuit (not shown separately).

Various embodiment methods may be implemented in a variety of personal computing devices, such as a laptop computer 700 as illustrated in FIG. 7. For example, images captured by an imaging sensor of the head-mounted device 100 may be wirelessly transmitted (e.g., via a Bluetooth or WiFi wireless communication link 708) to a laptop computer 700 where a processor 701 may perform a portion of the processing in any of the methods 200, 300, 400 and 500 and then transmit results back to the head-mounted device 100. A laptop computer 700 will typically include a processor 701 coupled to volatile memory 702, and a large capacity nonvolatile memory, such as a disk drive 704 of Flash memory. The laptop computer 700 may also include a floppy disc drive 705 coupled to the processor 706. The computer receiver device 700 may also include a number of connector ports or other network interfaces coupled to the processor 701 for establishing data connections or receiving external memory receiver devices, such as a Universal Serial Bus (USB) or FireWire® connector sockets, or other network connection circuits for coupling the processor 701 to a network (e.g., a communications network). In a notebook configuration, the computer housing includes the touchpad 710, the keyboard 712, and the display 714 all coupled to the processor 701. Other configurations of computing devices may include a computer mouse or trackball coupled to the processor (e.g., via a USB input) as are well known, which may also be used in conjunction with various embodiments.

The processors may be any programmable microprocessor, microcomputer or multiple processor chip or chips that may be configured by software instructions (applications) to perform a variety of functions, including the functions of the various embodiments described in this application. In some mobile devices, multiple processors may be provided, such as one processor dedicated to wireless communication functions and one processor dedicated to running other applications. Typically, software applications may be stored in the internal memory 606 before they are accessed and loaded into the processor. The processor may include internal memory sufficient to store the application software instructions.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods may be substituted for or combined with one or more operations of the methods.

The foregoing method descriptions and the process flow diagrams are provided merely as illustrative examples and are not intended to require or imply that the operations of various embodiments may be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, functional components, functionality components, circuits, and algorithm operations described in connection with the embodiments disclosed herein may be implemented as electronic hardware, computer software, or combinations of both. To clearly illustrate this interchangeability of hardware and software, various illustrative components, blocks, functional components, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement the various illustrative logics, logical blocks, functional components, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein, but is to be accorded the widest scope consistent with the following claims and the principles and novel features disclosed herein.

What is claimed is:

1. A head-mounted device for use in an augmented reality system, comprising:
   a memory;
   a touch sensor; and
   a processor coupled to the memory and the sensor, wherein the processor is configured to:
      receive information from the touch sensor, wherein the information is indicative of a change in position of the head-mounted device relative to a reference point on a face of a user; and
      adjust a rendering of an item of virtual content based on the change in position.

2. The head-mounted device of claim 1, wherein the information received from the touch sensor relates to a change in position of the head-mounted device relative to an eye of the user, and wherein the processor is configured to adjust the rendering of the item of virtual content based on the change in position of the head-mounted device relative to the eye of the user.

3. The head-mounted device of claim 2, further comprising an infrared (IR) sensor and IR light source configured to emit IR light towards the face of the user.

4. The head-mounted device of claim 2, further comprising an ultrasound sensor configured to emit a pulse of ultrasound towards the face of the user.

5. The head-mounted device of claim 2, further comprising a first camera configured to image a first eye of the user.

6. The head-mounted device of claim 5, further comprising a second camera configured to image a second eye of the user.

7. The head-mounted device of claim 1, further comprising an image rendering device coupled to the processor and configured to render the item of virtual content.

8. The head-mounted device of claim 1, wherein the processor is further configured to:
   determine an angle to an eye of the user from an image rendering device on the head-mounted device; and
   adjust the rendering of the item of virtual content based on the determined angle to the eye of the user and a determined distance between the head-mounted device and the reference point on the face of the user.

9. The head-mounted device of claim 1, wherein the touch sensor comprises a capacitance touch sensing circuit.

10. The head-mounted device of claim 1, wherein the touch sensor is embedded on a surface of the head-mounted device configured to engage the face of the user.

11. The head-mounted device of claim 10, wherein the touch sensor is configured to engage a nose of the user.

12. The head-mounted device of claim 1, further comprising a biometric sensor.

13. The head-mounted device of claim 1, further comprising one or more of a gyroscopic sensor and accelerometer.

14. A method of adjusting rendering of an item of virtual content in an augmented reality system to compensate for movement of a head-mounted device on a user, comprising:
   receiving, by a processor, information from a touch sensor, wherein the information is indicative of a change in position of the head-mounted device relative to a reference point on a face of the user; and
   adjusting, by the processor, the rendering of the item of virtual content based on the change position of the head-mounted device relative to the reference point on the face of the user.

15. The method of claim 14, wherein the reference point on the face of the user comprises an eye of the user.

16. The method of claim 14, further comprising determining a position of the head-mounted device relative to the reference point on the face of the user based on information received from an infrared (IR) sensor and IR light source configured to emit IR light towards the face of the user.

17. The method of claim 14, further comprising determining a position of the head-mounted device relative to the reference point on the face of the user based on information received from an ultrasound sensor configured to emit a pulse of ultrasound towards the face of the user.

18. The method of claim 14, further comprising determining a position of the head-mounted device relative to the reference point on the face of the user using a time-of-flight measurement.

19. The method of claim 14, further comprising determining a position of the head-mounted device relative to the reference point on the face of the user based on one or more images captured by an imaging sensor on the head-mounted device.

20. The method of claim 14, wherein the touch sensor comprises a capacitance touch sensing circuit.

21. The method of claim 14, wherein the touch sensor is embedded on a surface of the head-mounted device configured to engage the face of the user.

22. The method of claim 21, wherein the touch sensor is configured to engage a nose of the user.

23. A non-volatile processor-readable medium having stored thereon processor-executable instructions configured to cause a processor of a head-mounted device to perform operations comprising:

receiving, by a processor, information from a touch sensor, wherein the information is indicative of a change in position of the head-mounted device relative to a reference point on a face of the user; and adjusting, by the processor, the rendering of the item of virtual content based on the change position of the head-mounted device relative to the reference point on the face of the user.

24. The non-volatile processor-readable medium of claim 23, wherein the stored processor-executable instructions are configured to cause a processor of a head-mounted device to perform operations further comprising receiving information relating to a position of the head-mounted device relative to an eye of the user, and wherein the stored processor-executable instructions are configured to cause a processor of a head-mounted device to perform operations such that adjusting the rendering of the item of virtual content comprises adjusting rendering of the item of virtual content based on the position of the head-mounted device relative to the eye of the user.

25. The non-volatile processor-readable medium of claim 24, wherein the stored processor-executable instructions are configured to cause a processor of a head-mounted device to perform operations further comprising determining the position of the head-mounted device relative to the reference point on the face of the user based on information received from an infrared (IR) sensor and IR light source configured to emit IR light towards the face of the user.

26. The non-volatile processor-readable medium of claim 24, wherein the stored processor-executable instructions are configured to cause a processor of a head-mounted device to perform operations further comprising determining the position of the head-mounted device relative to the reference point on the face of the user based on information received from an ultrasound sensor configured to emit a pulse of ultrasound towards the face of the user.

27. The non-volatile processor-readable medium of claim 23, wherein the stored processor-executable instructions are configured to cause a processor of a head-mounted device to perform operations further comprising determining, by a processor, a position of the head-mounted device relative to the reference point on the face of the user based on one or more images captured by an imaging sensor on the head-mounted device.

* * * * *